United States Patent
Nguyen

(10) Patent No.: US 6,584,498 B2
(45) Date of Patent: Jun. 24, 2003

(54) DYNAMIC PRELOADING OF WEB PAGES

(75) Inventor: Julien Tan Nguyen, Redwood City, CA (US)

(73) Assignee: Planet Web, Inc., Redwood Shores, CA (US)

( * ) Notice: Subject to any disclaimer, the term of this patent is extended or adjusted under 35 U.S.C. 154(b) by 0 days.

(21) Appl. No.: 08/712,586

(22) Filed: Sep. 13, 1996

(65) Prior Publication Data

US 2002/0147788 A1 Oct. 10, 2002

(51) Int. Cl.[7] .............................................. G06F 19/00
(52) U.S. Cl. ......................... 709/219; 709/218; 709/310
(58) Field of Search ................................. 395/680, 793; 711/124; 707/513, 104, 500; 345/340; 709/218, 219, 310

(56) References Cited

U.S. PATENT DOCUMENTS

| | | | |
|---|---|---|---|
| 5,204,947 A | * 4/1993 | Bernstein | ................... 395/157 |
| 5,377,354 A | 12/1994 | Scannell et al. | |
| 5,499,109 A | 3/1996 | Mathur | |
| 5,508,817 A | 4/1996 | Kunigami | |
| 5,513,126 A | 4/1996 | Harkins et al. | |
| 5,548,789 A | 8/1996 | Nakanura | |
| 5,572,643 A | * 11/1996 | Judson | ...................... 395/793 |
| 5,574,843 A | 11/1996 | Gerlach, Jr. | |
| 5,619,648 A | 4/1997 | Canale et al. | |
| 5,623,603 A | 4/1997 | Jiang et al. | |
| 5,627,764 A | 5/1997 | Schutzman et al. | |
| 5,630,060 A | 5/1997 | Tang et al. | |
| 5,675,507 A | 10/1997 | Bobo | |
| 5,694,163 A | 12/1997 | Harrison | |
| 5,706,502 A | 1/1998 | Foley et al. | |
| 5,710,883 A | 1/1998 | Hong et al. | |

(List continued on next page.)

FOREIGN PATENT DOCUMENTS

WO     WO 99/50744 A1     10/1999

OTHER PUBLICATIONS

Blumenthal et al, "Step by Step to a World Class Web Site" Windows Magazine, v6, n8 p. 216 (11) Jul. 1995.*
Baker, Steven, "Hypertext Browsing on the Internet" v12 n9 p. 21 (6) Sep. 1994.*

(List continued on next page.)

*Primary Examiner*—Majid A. Banankhah
(74) *Attorney, Agent, or Firm*—Swernofsky Law Group PC

(57) ABSTRACT

The invention provides a method and system for dynamic preloading of web pages. In a system having a page server for transmitting pages upon request and a page client (or "web browser") for requesting pages and presenting those pages to an operator, the page client dynamically identifies links subsequent to the loaded page and preloads pages identified by those links for subsequent presentation to the operator, so that the preloaded pages are preloaded dynamically in response to operator selections and are available for presentation to the operator when ultimately selected. The page server and the page client may act independently or may cooperate so as to dynamically select and preload pages from the page server to the page client using parameters indicated by the page client (such as parameters selected by the operator or adaptively determined by the page client), parameters indicated by the web server (such as parameters selected by the page under presentation or adaptively determined by the page server), or parameters indicated by links to those subsequent pages, or responsive to a combination thereof. The page client may dynamically save and recall behavior information about pages to be presented, such behavior information possibly being independent of actual links indicated on the pages. The behavior information may be responsive to parameters selected by the operator parameters adaptively determined by the page client, or responsive to a combination thereof.

49 Claims, 1 Drawing Sheet

U.S. PATENT DOCUMENTS

| | | | |
|---|---|---|---|
| 5,724,574 A | | 3/1998 | Stratigos et al. |
| 5,734,835 A | | 3/1998 | Selker |
| 5,737,599 A | * | 4/1998 | Rowe et al. ................. 707/104 |
| 5,737,619 A | * | 4/1998 | Judson ....................... 707/500 |
| 5,742,768 A | | 4/1998 | Gennaro et al. |
| 5,754,700 A | | 5/1998 | Kuzma |
| 5,754,765 A | | 5/1998 | Danneels et al. |
| 5,754,851 A | | 5/1998 | Wissner |
| 5,761,673 A | * | 6/1998 | Bookman et al. ........... 707/104 |
| 5,764,235 A | | 6/1998 | Hunt et al. |
| 5,768,505 A | | 6/1998 | Gilchrist et al. |
| 5,781,741 A | | 7/1998 | Imamura et al. |
| 5,781,785 A | * | 7/1998 | Rowe et al. ................. 707/513 |
| 5,784,058 A | * | 7/1998 | LaStrange et al. .......... 345/340 |
| 5,784,553 A | | 7/1998 | Kolawa et al. |
| 5,787,470 A | * | 7/1998 | DeSimone et al. ......... 711/124 |
| 5,794,039 A | | 8/1998 | Guck |
| 5,794,259 A | | 8/1998 | Kikinis |
| 5,802,530 A | | 9/1998 | Van Hoff |
| 5,805,829 A | | 9/1998 | Cohen et al. |
| 5,809,512 A | | 9/1998 | Kato |
| 5,818,435 A | | 10/1998 | Kozuka et al. |
| 5,818,447 A | | 10/1998 | Wolf et al. |
| 5,826,102 A | | 10/1998 | Escobar et al. |
| 5,828,839 A | | 10/1998 | Moncreiff |
| 5,835,683 A | | 11/1998 | Corella et al. |
| 5,842,020 A | | 11/1998 | Faustini |
| 5,845,299 A | | 12/1998 | Arora et al. |
| 5,848,415 A | | 12/1998 | Guck |
| 5,850,446 A | | 12/1998 | Berger et al. |
| 5,854,893 A | | 12/1998 | Ludwig et al. |
| 5,870,544 A | | 2/1999 | Curtis |
| 5,875,322 A | | 2/1999 | House et al. |
| 5,878,223 A | | 3/1999 | Becker et al. |
| 5,889,942 A | | 3/1999 | Orenshteyn |
| 5,911,776 A | | 6/1999 | Guck |
| 5,918,012 A | | 6/1999 | Astiz et al. |
| 5,956,491 A | | 9/1999 | Marks ..................... 395/200.8 |
| 5,956,701 A | | 9/1999 | Habermehl |
| 5,963,217 A | | 10/1999 | Grayson et al. |
| 5,995,093 A | | 11/1999 | Lambourne |
| 6,014,688 A | | 1/2000 | Venkatraman |
| 6,029,164 A | | 2/2000 | Birrell et al. |

OTHER PUBLICATIONS

Tessier, Tom, "Using Java Script to Create Interactive Web Pages", Dr. Dobbs Journal on CDROM Mar. 1996.*

Brown, Mark; Using Netscape 2, pp. 147–168, 213–232, 1995.*

Marc A. Brown "A New Paradigm for Browsing The Web", May 17, 1995.*

Brown et al, "A new paradigm for browsing the Web", ACM digital library, 1995.*

Graham et al, "Webbed documents", ACM digital library, 1995.*

Blumfield, Julie R. et al "Step–By–Step To A World–Class Web Site". Windows Magazine. Jul. 1995. vol. 06. No. 08.

Tessier, Tom. "Using JavaScript to Create Interactive Web Pages". Dr. Dobb's Journal on CD–ROM.

Stephen R. Davis. "Teach Yourself Java Programming the Quick and Easy Way with Microsoft Visual: Learn Java Now". Microsoft Press. 3 0402 00136 8093.

* cited by examiner

DYNAMIC PRELOADING OF WEB PAGES

BACKGROUND OF THE INVENTION

1. Field of the Invention

This invention relates to dynamic preloading of web pages.

2. Description of Related Art

The World Wide Web is a feature of the Internet, which includes web page servers, for storing web pages and transmitting the information on those web pages on request, and web browsers, for requesting web pages from web page servers and presenting the information on those web pages to operators.

One problem which has arisen in the art is that it can take substantial time to transmit a web page from the web server to the web browser. This problem is particularly acute when the web server has other demands on its processing power, when the web page is laden with data or graphics, or when the communication link between the web server and the web browser has low communication bandwidth. An operator of the web browser perceives substantial transmission time as excessive latency in loading the web page and slow display of embedding graphics, each of which can degrade the utility for that operator of using the World Wide Web.

One known method has been to provide programs which, having been given a set of web pages, download those web pages to local storage in a "batch mode", for presentation by the web browser to the operator from the local storage. While this method provides for reduced latency in loading web pages, because they have already been downloaded before they are presented to the operator, it suffers from the drawback that the operator must specify which web pages are desired in advance. Thus, these methods sacrifice the interactive nature of the World Wide Web, which greatly reduces their usefulness.

Accordingly, it would be advantageous to provide a technique for loading web pages more quickly, while preserving the interactive nature of the World Wide Web. This advantage is achieved by a method and system according to the present invention in which pages are dynamically preloaded when links to those pages are accessed, so that latency and display time for those web pages is markedly decreased, while allowing the operator to dynamically select web pages for presentation.

SUMMARY OF THE INVENTION

The invention provides a method and system for dynamic preloading of web pages. In a system having a page server for transmitting pages upon request and a page client (or "web browser") for requesting pages and presenting those pages to an operator, the page client dynamically identifies links subsequent to the loaded page and preloads pages identified by those links for subsequent presentation to the operator, so that the preloaded pages are preloaded dynamically in response to operator selections and are available for presentation to the operator when ultimately selected.

In preferred embodiments, the page server and the page client may act independently or may cooperate so as to dynamically select and preload pages from the page server to the page client using parameters indicated by the page client (such as parameters selected by the operator or adaptively determined by the page client), parameters indicated by the page server (such as parameters selected by the page under presentation or adaptively determined by the page server), or parameters indicated by links to those subsequent pages, or responsive to a combination thereof.

In further preferred embodiments, the page client may dynamically save and recall behavior information about pages to be presented, such behavior information possibly being independent of actual links indicated on the pages. The behavior information may be responsive to parameters selected by the operator parameters adaptively determined by the page client, or responsive to a combination thereof.

DESCRIPTION OF THE PREFERRED EMBODIMENT

Figure 1:
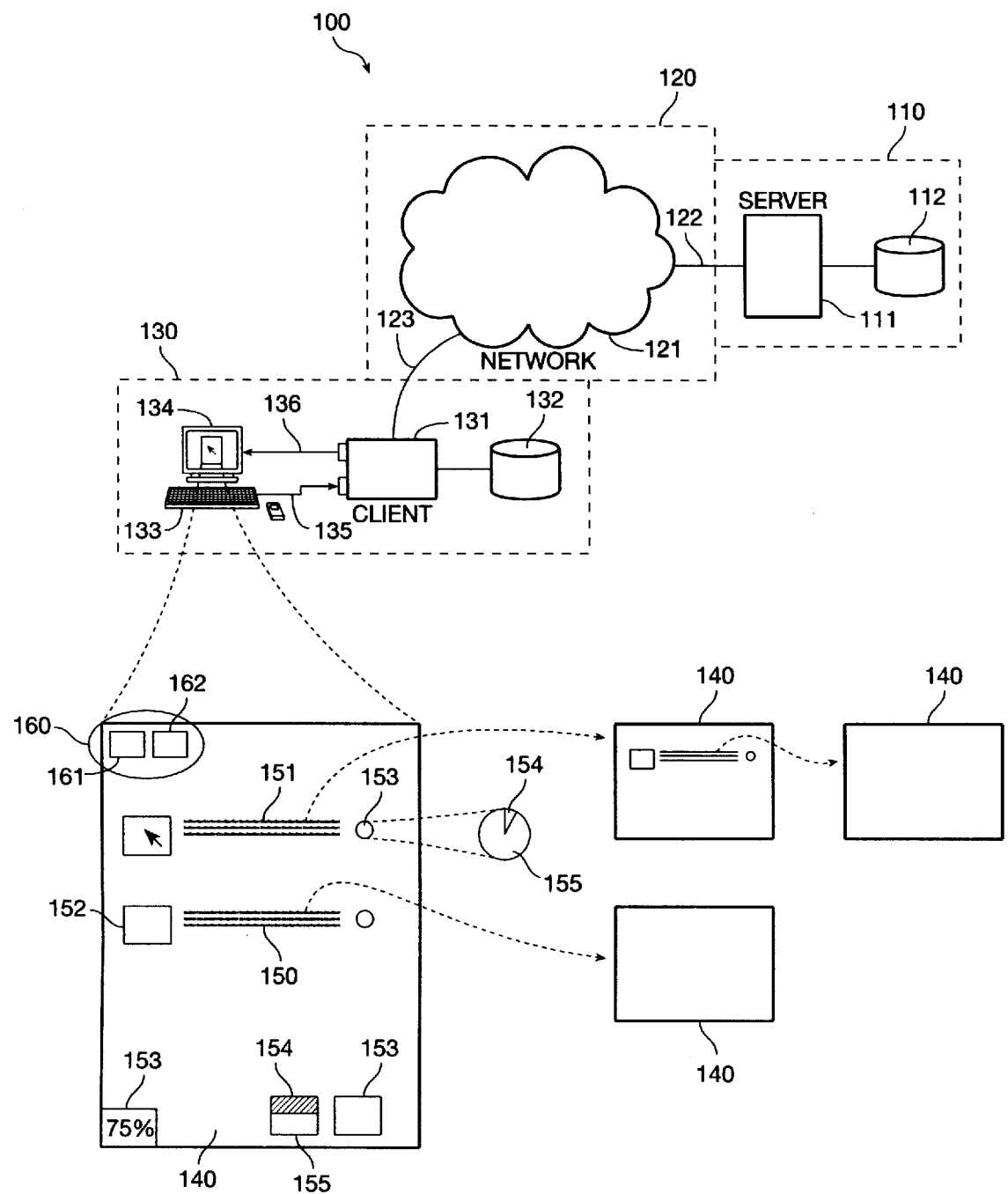
FIG. 1 shows a system for accessing web pages.

Embodiments of this invention may be used together with inventions described in the following co-pending application, hereby incorporated by reference as if fully set forth herein:

application Ser. No. 08/716,641, filed Jul. 13, 1996, in the name of inventor Julien T. Nguyen, titled "Dynamic Downloading of Messages with Low-Bandwidth Connections", attorney docket number MWEB-002, assigned to the same assignee.

In the following description, a preferred embodiment of the invention is described with regard to preferred process steps and data structures. However, those skilled in the art would recognize, after perusal of this application, that embodiments of the invention may be implemented using a general purpose processor, and that modification of a general purpose processor to implement the process steps and data structures described herein would not require undue invention.

System for Accessing Web Pages

FIG. 1 shows a system for accessing web pages.

A system 100 for accessing web pages comprises a page server 110, a communication link 120, and a page client 130.

In a preferred embodiment, the page server 110 comprises a server processor 111 and server storage 112, with the processor 111 comprising at least one general purpose computer having a computing element, program and data memory.

The page server 110 is disposed for generating and responding to messages in a protocol for presenting web pages to the page client 130. The protocol is preferably the Hypertext Transfer Protocol ("HTTP"), but the concepts of the invention are broad enough to apply to other protocols for transferring and presenting information, including protocols known as "FSP", "FTP", "Gopher", and variants thereof, protocols for access to a command interface such as "Telnet", "MUD", "MUSH", "MOO", and variants thereof, other protocols for accessing, transmitting, or presenting information, and programs making use of such protocols, such as "Archie", "Veronica", "Jughead", and the like.

In alternative embodiments, the page server 110 may comprise more than one server processor 111 coupled together so as to respond to requests for accessing and transmitting information. For example, a first server processor 111 may handle requests for information by parsing those requests and obtaining data from a second server processor 111. Each server processor 111 may comprise more than one computing element, such as a multi-processor general purpose computer.

In a preferred embodiment, the communication link 120 comprises a dynamic link using a network 121 (such as a local area network or a wide area network) or a network of networks (such as an "internet" or an "intranet"). The page server 110 is coupled to the network using a server local link 122, such as a T1 line or other telephone line; similarly, the page client 130 is coupled to the network using a client local link 123, such as a telephone line and a modem such as an ISDN modem or a 28.8 Kbps analog modem. Other techniques for coupling the page server 110 and the page client 130 to the network 121 are known in the art.

The page client 130 similarly comprises a processor 131 and client storage 132, with the processor 111 comprising a general purpose processor having a computing element, and program/data memory. In a preferred embodiment, preferred process steps and data structures for the page client 130 are specified in the "Java" computer language. The general purpose processor may comprise any processor disposed to interpret or to compile the "Java" computer language, such as an Intel "Pentium" processor operating at 90 megahertz, having 32 megabytes of program/data memory, operating under control of the Microsoft "Windows 95" operating system, and coupled to 1.0 gigabytes of client storage 132.

In a first preferred embodiment, the page client 130 comprises an input element 133 and a display element 134. The input element 133 comprises a keyboard and a pointing device such as a mouse or trackball. The display element 134 comprises a visual display element such as a monitor or a display panel, and an audio display element such as a speaker.

In a second preferred embodiment, the page client 130 does not include both the input element 133 and the display element 134, but is disposed for coupling to devices for performing those functions and which are supplied by an operator. For example, the page client 130 may comprise an input port 135 disposed for coupling to the input element 133, an output port 136 disposed for coupling to the display element 134, or both.

The operator may be a human being directing the operations of the page client 130, or alternatively may be another program using the page client 130 to obtain information from the page server 110.

Dynamic Preloading of Web Pages

A primary page 140 presented on the output element 134 comprises information for presentation to an operator. The information may be visual information (in the form of text, graphics, or motion picture data), may be audio information, or may be information in another format. There are several formats for information available via web pages which are known in the art of networking.

The primary page 140 may also comprise one or more applets, scripts, or other included programs to the page client 130 to engage in behavior as programmed by the primary page 140. The page client 130 responds to an included program by interpreting or compiling it as received and performing the instructions specified by the included program, unless specified otherwise by the operator in a set of preferences.

The primary page 140 may also comprise a security restriction which requires that the page client 130 supply a password or other authentication to the page server 110 before the page 140 is permitted to be transmitted from the page server 110 to the page client 130. The page client 130 responds to the security restriction by requesting a password or other authentication from the operator, and by transmitting that password or other authentication to the to the page server 110. In a preferred embodiment, that password or other authentication is requested once from the operator in a single session of operating the page client 130, and is not requested a second time in the single session, unless specified otherwise by the operator in a set of preferences.

The primary page 140 comprises one or more links 150 which point to secondary pages 140. The secondary pages 140 are web pages just like the primary page 140, and are referred to herein as "secondary" simply to distinguish them from the primary page 140. The secondary pages 140 may also comprise links 150, and in fact the links 150 on the secondary pages 140 may point to tertiary pages 140, to other secondary pages 140, or even back to the primary page 140. In fact, the links 150 on the primary page 140 may even point back to the same primary page 140, such as links 150 which points to the top, bottom, or some other location on the primary page 140.

Links 150 are embedded in pages 140 using a set of HTML tags, or by other techniques for identifying other pages 140 which may be presented. Links 150 are themselves presented to the operator as text elements 151 or as graphic elements 152. Links 150 may be identified by the page client 130 by special forms of display, for example by displaying text in a different color or typeface from text elements 151 or as graphic elements 152 which are not associated with links 150.

When a page 140 is loaded for presentation to the operator, the page client 130 identifies that page 140 as the primary page 140 and identifies one or more links 150 embedded in the primary page 140. The page client 130 selects one or more of the secondary pages 140 pointed to by those links 150 for preloading, and preloads those secondary pages 140. The page client 130 preloads secondary pages 140 by (1) transmitting a request to the page server 110 to transmit those secondary pages 140, (2) receiving those secondary pages 140 from the page server 110, and (3) recording those secondary pages 140 in client storage 132 for later presentation upon demand.

The page client 130 identifies each one of those links 150 as being in one of three preloading states, using one of a set of display colors, as shown in table 1—1.

TABLE 1-1

| Preloading State | Display Color | Nature of State |
| --- | --- | --- |
| not started | red | the secondary page has not started preloading yet |
| in progress | orange | the secondary page is currently being preloaded |
| completed | green | the secondary page is preloaded and is ready for presentation |

The choice of display colors is, of course, completely arbitrary. Other colors, patterns, or other visual or audible indicators may be used instead or in conjunction to present the operator with information about the preloading stage for any particular link 150. The choice of display colors may be responsive to choices made by the operator, as for example by setting one or more preferences with the page client 130, or may be responsive to choices made by the author of the primary page 140, as for example by transmitting such information by the page server 110 to the page client 130 such as using a set of extended HTML tags with the primary page 140.

The page client 130 presents the preloading state using a preloading indicator 153. To indicate the progress of the "in progress" preloading stage, the preloading indicator 153 comprises a first part 154 having a first display color or pattern and a second part 153 having a second display color or pattern; the shape or size of the first part 154 relative to the second part 155 is used to indicate the progress of the "in progress" preloading stage.

In a first preferred embodiment, the preloading indicator 153 comprises a dot or other shape which is superposed on the primary page 140. In this preferred embodiment, the first part 154 comprises a pie slice of the dot or small circle which by its angle and its color (green) indicates an amount of the "in progress" preloading stage which has been completed, and the second part 155 by its angle and its color (orange) indicates an amount which has not been completed. Thus the image of the dot or small circle will change color from orange to orange/green to green as the preloading operation progresses.

In a second preferred embodiment, the preloading indicator 153 comprises an underline or other text features (such as boldface, italics, or inverted video) superposed directly on text elements 151 for the link 150. In this preferred embodiment, the first part 154 comprises a segment of the underline or of the text elements 151 for the link 150 which by its relative length and its color (green) indicates an amount of the "in progress" preloading stage which has been completed, and the second part 155 by its relative length and its color (orange) indicates an amount which has not been completed. Thus the underlining or the text elements 151 for the link 150 will change color from orange to orange/green to green (or alternatively, the text elements 151 for the link 150 will change typeface from boldface to bold-face/italic to italic) as the preloading operation progresses.

In a third preferred embodiment, the preloading indicator 153 comprises a preview "thumbnail" picture (i.e., a copy of the secondary page 140 presented in miniature), presented at a location outside the margin of the primary page 140, such as a location outside a display region for the primary page 140 or a display region for a separate "frame" for a primary page 140. In this preferred embodiment, the first part 154 comprises a segment of the thumbnail picture which presents information from the secondary page 140 as that secondary page 140 is preloaded, and the second part 155 comprises a background color or other indicator that further data is yet to be preloaded. Thus the thumbnail picture will fill the location for its presentation as the preloading operation progresses.

In addition to the first part 154 and the second part 155, the preloading indicator 153 comprises a textual or graphical indicator, positioned at a margin of the primary page 140 (such as in a margin for a window used for presentation of the visual elements of the primary page 140), indicating an amount of the "in progress" preloading state which has been completed. For example, when 75% of the secondary page 140 is preloaded, the preloading indicator 153 comprises the text "75% preloaded" or some equivalent statement, or comprises a thermometer graph showing that 75% of the secondary page 140 is preloaded.

The preloaded secondary pages 140 are stored in the client storage 132. When the operator follows one of the links 150 to one of the secondary pages 140, that secondary page 140 is presented to the operator by reference to the client storage 132, rather than by requesting that secondary page 140 from the page server 110.

In a preferred embodiment, any applets, scripts, or other included programs specified by the secondary page 140 are not performed until the secondary page 140 is selected by the operator and becomes the primary page 140. However, in alternative embodiments, some of the included programs may be performed earlier, such as when thumbnail pictures of secondary pages 140 are presented for viewing in miniature, or as otherwise specified by the operator in a set of preferences.

In further alternative embodiments, the page client 130 determines whether or not to preload, and whether or not to run, applets, scripts, or other included programs, responsive to a set of operator preferences.

In a preferred embodiment, any password or other authentication required by security restrictions for the secondary page 140 is not requested until the secondary page 140 is selected by the operator and becomes the primary page 140. However, in alternative embodiments, the password or other authentication may be supplied by the page client 130 using a stored password or other authentication, or as otherwise specified by the operator in a set of preferences. Stored passwords are known in the art of authentication. In such alternative embodiments, the page client 130 may encrypt or otherwise secure the secondary page 140 in the client storage 132, so that unauthorized users cannot view the secondary page 140 if the operator leaves the vicinity of the input element 133 and display element 134, until the operator follows the link 150 to the secured secondary page 140.

In addition to storing the preloaded secondary page 140 in the client storage 132, the page client 130 performs any preloading behavior which has been specified by a set of operator preferences. For example, the specified preloading behavior may include one or more of the following behaviors: (1) further preloading of tertiary pages 140; (2) launching of one or more applications or helper applications for ultimate presentation of the preloaded secondary page 140; and (3) decompression or translation of the preloaded secondary page 140 from one format to another.

When it is presented to the operator, the secondary page 140 logically becomes the primary page 140, preloading of any other secondary pages 140 is aborted, and the page client 130 preloads those (new) secondary pages 140 which are pointed to by the (new) primary page 140 in like manner as it preloaded those (old) secondary pages 140 which were pointed to by the (old) primary page 140.

Dynamic preloading of secondary pages 140 continues so long as the operator continues to follow links 150 and thus request presentation of secondary pages 140, which logically become (new) primary pages 140.

Ordering Web Pages for Dynamic Preloading

In a preferred embodiment, the page client 130 dynamically orders the secondary pages 140 for preloading, and selects those secondary pages 140 for preloading which the page client 130 dynamically considers should be preloaded first.

The page client 130 makes its selection responsive to one or more of the following factors: (1) preferences explicitly indicated by the operator; (2) preferences adaptively determined by the page client 130; (3) preferences explicitly indicated by the primary page 140; and (4) preferences implicitly indicated by the page server 110.

In a preferred embodiment, preferences explicitly indicated by the operator include the following:

The operator may explicitly select a particular secondary page 140 for preloading (e.g., while the operator reviews the primary page 140).

In this circumstance, the operator selects the secondary page 140 for preloading using the input element 133, such as by pointing to the associated link 150 or to its preloading indicator 153 and selecting the secondary page 140 for preloading. When the preloading indicator 153 is a separate dot or circle the operator selects that preloading indicator 153 using a mouse left-click; when the preloading indicator 153 is superposed on the text elements 151 for the link 150 itself the operator selects that link 150 using another mouse operation such as a right-click or a shift-click.

If the operator selects a particular secondary page 140 for preloading, the selected secondary page 140 takes priority and is preloaded before other secondary pages 140 which might be preloaded for other reasons.

The operator may explicitly select a set of preloading preferences and priorities.

In this circumstance, the page client 130 receives the preloading preferences and their relative priorities from the operator, and stores the preloading preferences and their relative priorities in the client storage 132. When the operator selects one primary page 140, the page client 130 reviews the preloading preferences and their relative priorities, and preloads those secondary pages 140 which are indicated by the preloading preferences in the order of their relative priorities.

The preloading preferences select among those links 150 to secondary pages 140 responsive to one or more of the following factors: (1) whether those links 150 comprise text elements 151 or graphics elements 152; (2) if text elements 151, whether those links 150 comprise particular keywords; (3) if graphics elements 152, whether those links 150 have particular display sizes; and (4) whether those links 150 point to secondary pages 140 at the same page server 110 or another page server 110.

For example, the preloading preferences may indicate to preload all secondary pages 140; to preload all secondary pages 140 associated with links 150 comprising text elements 151 having today's date as a keyword; or to preload all secondary pages 140 which are not advertisements (defined by links 150 comprising graphics elements 152 and pointing to another page server 110).

The operator may explicitly select one or more buttons provided by the page client 130 to indicate specific preloading behavior.

The page client 130 provides buttons for selection by the operator with specific preloading behavior. For example, when the operator has not already specified that all secondary pages 140 should be preloaded, the page client 130 provides a button which the operator may select to instruct the page client 130 to conduct that preloading behavior for one particular primary page 140.

In a preferred embodiment, the page client 130 adaptively determines possible operator preferences and presents those possible operator preferences as buttons for selection to indicate specific preloading behavior.

In a preferred embodiment, preferences adaptively determined by the page client 130 include the following:

The page client 130 may record the operator's history of selecting primary pages 140 for presentation.

The page client 130 attempts to adaptively determine the operator's preloading preferences and their relative priorities from the operator's history of selecting primary pages 140 for presentation. When the operator selects a primary page 140 for presentation, the page client 130 increases relative priorities for categories of pages 140 and links 150 which match the selected primary page 140, and decreases relative priorities for other categories.

The page client 130 may record the operator's history of selecting secondary pages 140 for preloading.

Similar to treatment of the operator's history of selecting primary pages 140 for presentation, the page client 130 attempts to adaptively determine the operator's preloading preferences and their relative priorities from the operator's history of selecting secondary pages 140 for preloading.

In a preferred embodiment, preferences explicitly indicated by the primary page 140 include the following:

The primary page 140 may comprise directions for which secondary pages 140 to preload and in which order.

In a preferred embodiment, these directions are specified by a set of extended HTML parameters, such as informational tags which are not presented to the operator; however, in alternative embodiments, these directions may be specified explicitly in a title or heading, or in the text or other parts of the primary page 140.

The individual links 150 in the primary page 140 may each comprise directions whether their associated secondary page 140 should be preloaded and with what relative priority.

In a preferred embodiment, these directions are specified in the extended HTML tag for the link 150 or in an extended HTML tag associated with the link 150. However, in alternative embodiments, these directions may be specified explicitly in a link name or link pointer, or in the text or other parts of the primary page 140 associated with the link 150.

In a preferred embodiment, preferences implicitly indicated by the page server 110 include the following:

The page server 110 may provide information regarding which secondary pages 140 take the most time to preload.

The page server 110 may provide this information in response to the size in bytes of particular secondary pages 140, the amount of load on the page server 140 (if those secondary pages 140 are not located at other page servers 140), recent measurements of actual times to preload those secondary pages 140, some other estimate of transmission time to preload the secondary page 140, or some combination thereof.

The page server 110 may provide information regarding which secondary pages 140 have been most often selected for presentation.

The page server 110 may provide this information in response to a recent number of times each particular secondary page 140 has been transmitted to a page client 130, has been transmitted to the particular page client 130 in use by the operator (or some class of page clients 130 such as those in a specified geographic area or logical domain or subdomain), or has been preloaded or has been selected for presentation.

Virtual Links to Web Pages

In a preferred embodiment, the page client 130 records operator preferences for an order (i.e., a list of links 150 in a specified order) for selecting pages 140 for presentation, herein called a "browsing order", in the client storage 132. In the browsing order, the operator identifies pages 140 by any technique, including by following links 150, by reference to bookmarks or other stored pointers to pages 140, by entry of a universal resource locator ("URL"), or by any other means.

For example, if the operator has a set of on-line magazines or other publications to read periodically, the page client 130 records in the client storage 132 the set of publications and the order in which the operator selects them. In a preferred embodiment, the page client 130 obtains this information from the operator specifying the browsing order, by adaptively determining the browsing order from the operator's selection of pages 140 for presentation, or by receiving the browsing order from one of the page servers 110.

When a page 140 is selected by the operator for presentation as the primary page 140, the page client 130 identifies two virtual links 160, a next link 161 and a previous link 162 in the browsing order. The page client 130 treats the virtual links 160 as if they were actual links 150 embedded in the primary page 140, even though there might be no such link 150 to those secondary pages 140 anywhere in the primary page 140.

Thus, the page client 130 provides a set of buttons for the virtual links 160 so that the operator may select one of the virtual links 160 and follow the selected virtual link 160 to the next link 161 or to the previous link 162. Similarly, the page client 130 treats the pages 140 pointed to by the virtual links 160 as secondary pages 140 for the primary page 140, and performs preloading with regard to those secondary pages 140 just as if there were actual links 150 in the primary page 140 to those same secondary pages 140.

The page client 130 disposes the buttons for the virtual links 160 outside the margin of the primary page 140, such as a location outside a display region for the primary page 140 14 or a display region for a separate "frame" for a primary page 140, unless the virtual links 160 are duplicative of actual links 150 within the primary page 140. However, in alternative embodiments, the page client 130 may superpose the virtual links 160 over the presentation for the primary page 140, so that the virtual links 160 appear as if they were actual links 150.

The browsing order may comprise branches, conjoined nodes, loops, and disjoint pages, in which circumstances there will be some pages 140 which have zero or more than one virtual link 160 pointing to the next link 161, zero or more than one virtual link 160 pointing to the previous link 162, or some combination thereof.

The page client 130 stores the browsing order in the client storage 132 and may refer to the browsing order using a bookmark or similar reference technique. The browsing order may also comprise a set of preloading preferences which are specific to the browsing order, and these may be stored in the client storage 132 in association with the browsing order or the bookmark or similar reference technique which refers to that browsing order. Thus, the operator may specify both a list of links 150 to be visited and may further specify for example, that all of the pages 140 associated with those links 150 should be preloaded while the operator takes time to review the first such page 140.

The page client 130 may also define virtual links 160 which are not part of a browsing order, such as defining one or more virtual links 160 for a page 140 which point to other pages 140 at the same page server 110.

Alternative Embodiments

Although preferred embodiments are disclosed herein, many variations are possible which remain within the concept, scope, and spirit of the invention, and these variations would become clear to those skilled in the art after perusal of this application.

I claim:

1. A method of presenting information in pages to an operator, including the steps of loading a first page which has been dynamically selected by an operator;

identifying a link pointing to a second page; and automatically preloading said second page based on the identified link, the second page preloaded for later presentation while said first page is being presented without interrupting presentation of said first page.

2. A method as claim 1, including the step of presenting said second page in response to dynamic selection of said link by said operator.

3. A method as in claim 1, including the steps of storing said second page in memory; and presenting said second page in response to selection of said link by said operator.

4. A method as in claim 1, including the step of presenting to said operator a status of said step of preloading said second page.

5. A method as in claim 4, wherein said step of presenting includes the step of displaying a graphic element overlaid with a display of said link.

6. A method as in claim 4, wherein said step of presenting includes the steps of displaying a partial preview of said second page; and altering said partial preview in response to a change in status of said step of preloading said second page.

7. A method as in claim 4, wherein said step of presenting includes the step of displaying a preview of said second page in a distinct format.

8. A method as in claim 4, wherein said step of presenting includes the step of displaying at least one graphic element.

9. A method as in claim 4, wherein said step of presenting includes the step of displaying said link in a first part and a second part, said first part and said second part being distinguished by boldface, brightness, color, font, hue, italics, or typeface.

10. A claim as in claim 4, wherein said step of presenting includes the steps of displaying said link in a format having a first part and a second part, said first part and said second part being visually distinct; and altering said format in response to a change in status of said step of preloading said second page.

11. A method as in claim 4, wherein said step of presenting includes the step of displaying text.

12. A method as in claim 1, wherein said first page includes a plurality of links, said plurality including said link pointing to said second page; and said step of identifying includes the step of selecting said link from among said plurality of links.

13. A method as in claim 12, wherein said step of selecting includes the steps of displaying a button associated with said link; and receiving an input from said operator selecting said button.

14. A method as in claim 12, wherein said step of selecting includes the step of evaluating, from said plurality of links, which ones of said plurality point to advertisements; and said step of selecting is responsive to a result of said step of evaluating.

15. A method as in claim 12, wherein said step of selecting includes the step of receiving an input from said operator selecting said link.

16. A method as in claim 12, wherein said step of selecting is responsive to a preference by said operator.

17. A method as in claim 12, wherein said step of selecting is responsive to an HTML tag associated with said link.

18. A method as in claim 12, wherein said step of selecting is responsive to at least one datum in said first page.

19. Apparatus for presenting information in pages to an operator, including a first memory portion having stored therein a first page which has been dynamically selected by an operator, means for identifying a link pointing to a second page;

a second memory portion having preloaded therein said second page for later presentation, said second page being preloaded therein automatically based on the identified link while said first page is being presented without interrupting presentation of said first page.

20. Apparatus as in claim 19, including an output port disposed to present said second page in response to dynamic selection of said link by said operator.

21. Apparatus as in claim 19, including a progress indicator for preloading said second page.

22. Apparatus as in claim 21, wherein said progress indicator includes a graphic element overlaid with a display of said link.

23. Apparatus as in claim 21, wherein said progress indicator includes a partial preview of said second page.

24. Apparatus as in claim 21, wherein said progress indicator includes a preview of said second page in a distinct format.

25. Apparatus as in claim 21, wherein said progress indicator includes at least one graphic element.

26. Apparatus as in claim 21, wherein said progress indicator includes a first part of said link and a second part of said link, said first part and said second part being distinguished by boldface, brightness, color, font, hue, italics, or typeface.

27. Apparatus as in claim 21, wherein said progress indicator includes a first part of said link and a second part of said link, said first part and said second part being visually distinct.

28. Apparatus as in claim 21, wherein said progress indicator includes text.

29. Apparatus as in claim 19, wherein said first page includes a plurality of links, said plurality including said link pointing to said second page; and said means for identifying includes means for selecting said link from among said plurality of links.

30. Apparatus as in claim 29, wherein said means for selecting includes a button associated with said link; and an input port coupled to said button.

31. Apparatus as in claim 29, wherein said means for selecting is responsive to a means for evaluating, for said plurality of links, which ones of said plurality point to advertisements.

32. Apparatus as in claim 29, wherein said means for selecting is responsive to a preference by said operator.

33. Apparatus as in claim 29, wherein said means for selecting is responsive to an HTML tag associated with said link.

34. Apparatus as in claim 29, wherein said means for selecting is responsive to at least one datum in said first page.

35. In apparatus for presenting information in pages to an operator, said apparatus including a first page which has been dynamically selected by an operator, a method comprising identifying a browsing order for a plurality of pages which is automatically preloaded for presentation to said operator; and displaying a virtual link to one page in said browsing order on said first page, said one page not being associated with any real link on said first page;

wherein said virtual link is to a next page in the browsing order or to a previous page in the browsing order.

36. A method as in claim 35, including the steps of associating said browsing order with a bookmark; and loading a plurality of pages in said browsing order in response to selection of said bookmark.

37. A method as in claim 35, including the step of building said browsing order in response to a plurality of links selected by said operator.

38. A method as in claim 35, including the step of storing said browsing order in a memory.

39. A method as in claim 35, wherein said browsing order comprises a list of links; and said virtual link points to either a next page or a previous page in said list.

40. A method as in claim 35, including the step of preloading a secondary page associated with said virtual link.

41. Apparatus for storing information for presentation in pages to an operator, said apparatus including memory storing a first page which has been dynamically selected by an operator, said apparatus comprising a first memory portion storing a browsing order which is automatically preloaded for a plurality of hypertext pages for presentation to said operator; and a second memory portion storing a virtual link to one page in said browsing order on said first page, said one page not being associated with any real link on said first page;

wherein said virtual link is to a next page in the browsing order or to a previous page in the browsing order.

42. Apparatus as in claim 41, including a bookmark associated with said browsing order; and a memory comprising a plurality of pages in said browsing order preloaded in response to selection of said bookmark.

43. Apparatus as in claim 41, including a memory having said browsing order stored therein.

44. Apparatus as in claim 41, wherein said browsing order comprises a list of links; and said virtual link points to either a next page or a previous page in said list.

45. Apparatus as in claim 41, including a memory comprising a preloaded secondary page associated with said virtual link.

46. A method as in claim 12, wherein said link is selected to identify said second page for preloading in response to a first input by said operator that is different from a second input by said operator for selecting a link to identify said second page for loading and presentation.

47. A method as in claim 46, wherein said first operator input is right clicking or shift-clicking on said link with a mouse, and said second operator input is left clicking with said mouse.

48. Apparatus as in claim 29, wherein said means for selecting identifies said second page for preloading in response to first operator input that is different from second operator input for selecting a link to identify said second page for loading and presentation.

49. A method as in claim 48, wherein said first operator input is right clicking or shift-clicking on said link with a mouse, and said second operator input is left clicking with said mouse.

* * * * *